United States Patent
Geertsen et al.

(10) Patent No.: US 10,999,898 B2
(45) Date of Patent: May 4, 2021

(54) ELECTRICALLY HEATED FLUID TRANSPORTATION PIPE

(71) Applicant: ITP SA, Louveciennes (FR)

(72) Inventors: Christian Geertsen, Versailles (FR); Philippe Marchal, Vaucresson (FR)

(73) Assignee: ITP SA, Louvenciennes (FR)

( * ) Notice: Subject to any disclaimer, the term of this patent is extended or adjusted under 35 U.S.C. 154(b) by 1088 days.

(21) Appl. No.: 14/944,867

(22) Filed: Nov. 18, 2015

(65) Prior Publication Data
US 2016/0138749 A1    May 19, 2016

(30) Foreign Application Priority Data
Nov. 18, 2014 (FR) ...................................... 14.02576

(51) Int. Cl.
| H05B 3/56 | (2006.01) |
| H05B 3/46 | (2006.01) |
| F16L 9/18 | (2006.01) |
| F16L 53/38 | (2018.01) |

(52) U.S. Cl.
CPC ................. *H05B 3/56* (2013.01); *F16L 9/18* (2013.01); *F16L 53/38* (2018.01); *H05B 3/46* (2013.01); *H05B 2214/03* (2013.01)

(58) Field of Classification Search
CPC .. H05B 3/56; F16L 53/30; F16L 53/38; F16L 59/18; H01B 7/0291
USPC .................. 392/480; 138/137, 149; 137/375
See application file for complete search history.

(56) References Cited

U.S. PATENT DOCUMENTS

| 3,801,725 | A | * | 4/1974 | Farish ................. H01B 9/0672 174/142 |
| 3,955,601 | A | | 5/1976 | Plummer, III |
| 4,175,048 | A | * | 11/1979 | Christophorou ..... H02B 13/055 174/137 B |
| 2003/0008158 | A1 | * | 1/2003 | Carrus .................. H01B 3/441 428/458 |
| 2003/0015436 | A1 | * | 1/2003 | Bass ...................... C23F 13/02 205/740 |

(Continued)

FOREIGN PATENT DOCUMENTS

| DE | 10051111 A1 | 4/2002 |
| GB | 1081889 A | 9/1967 |

OTHER PUBLICATIONS

Jul. 6, 2015 Search Report issued in French Patent Application No. 1402576.

*Primary Examiner* — Erin E McGrath
(74) *Attorney, Agent, or Firm* — Oliff PLC

(57) ABSTRACT

The invention relates to a heated pipe for the transportation of a fluid comprising:
  a fluid transportation casing,
  one or several electric heating cables each arranged along the transportation casing, each cable comprising an electrically conductive core arranged in an electrically insulating and thermally conductive sheath,
  a thermally insulating material applied onto said heating cable or cables and onto the transportation casing,
  an external casing arranged around the thermally insulating material and made integral with the transportation casing in a sealed manner so as to define at least one annular space enabling its pressure to be reduced, the pipe additionally comprises means to reduce partial electrical discharges between said heating cable or cables and the transportation casing.

13 Claims, 4 Drawing Sheets

(56) References Cited

U.S. PATENT DOCUMENTS

2012/0298216 A1 11/2012 Geertsen
2015/0276113 A1* 10/2015 Bass .................. B32B 27/32
 392/466

* cited by examiner

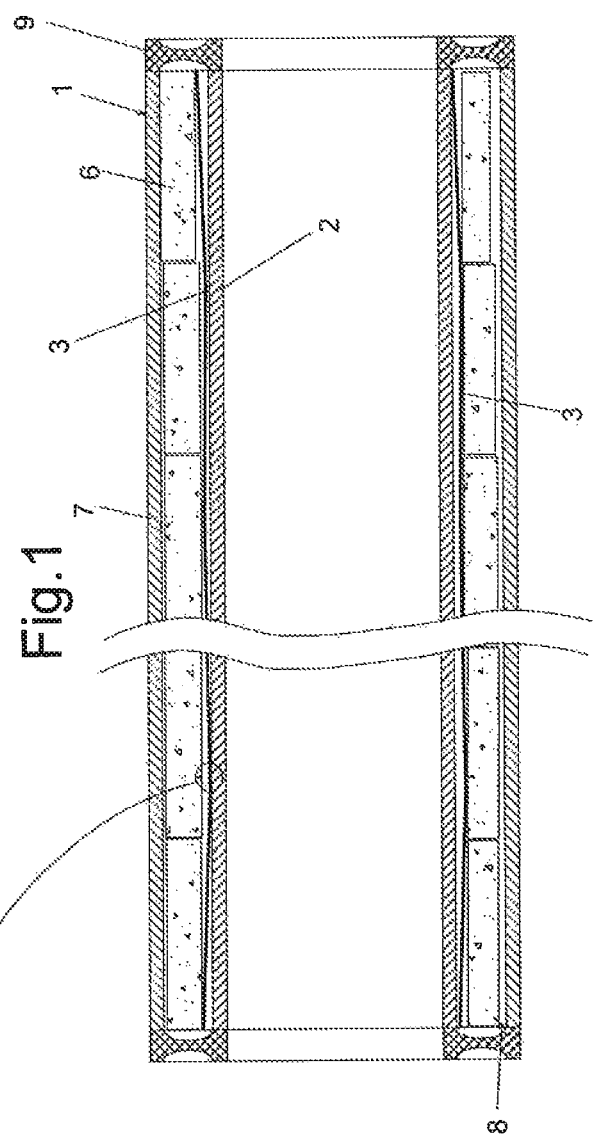
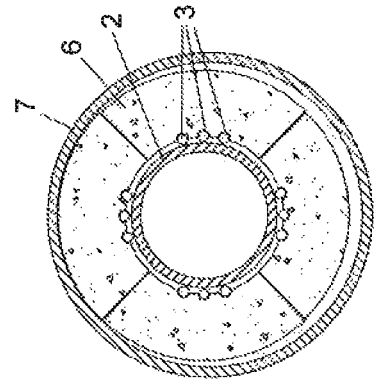
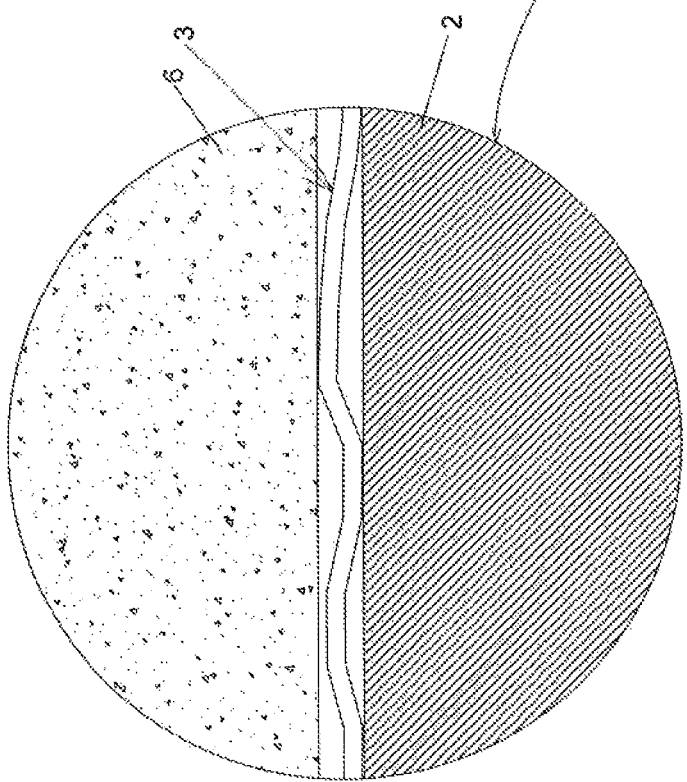

```
┌─────────────────────────────────────────────────────────────┐
│ The electric heating cables are arranged around and along   │
│ the transportation casing                                    │
└─────────────────────────────────────────────────────────────┘
                              │
┌─────────────────────────────────────────────────────────────┐
│ A thermally insulating material is positionned around the   │
│ electric heating cables                                      │
└─────────────────────────────────────────────────────────────┘
                              │
┌─────────────────────────────────────────────────────────────┐
│ The internal casing and the thermally insulating material   │
│ are introduced into an external casing                       │
└─────────────────────────────────────────────────────────────┘
                              │
┌─────────────────────────────────────────────────────────────┐
│ The external casing is joined and sealed to the             │
│ transportation casing so as to define an annular space       │
└─────────────────────────────────────────────────────────────┘
                              │
┌─────────────────────────────────────────────────────────────┐
│ Gas is pumped into the annular space                         │
└─────────────────────────────────────────────────────────────┘
                              │
┌─────────────────────────────────────────────────────────────┐
│ Insulating gas is pumped into the annular space              │
└─────────────────────────────────────────────────────────────┘
                              │
┌─────────────────────────────────────────────────────────────┐
│ The annular space is closed and sealed                       │
└─────────────────────────────────────────────────────────────┘
```

Fig.4

ELECTRICALLY HEATED FLUID TRANSPORTATION PIPE

BACKGROUND OF THE INVENTION

1. Field of the Invention

The technical scope of the present invention is that of pipes for the transportation of fluids such as hydrocarbons.

2. Description of the Related Art

It is conventional for thermally insulated pipes to be used to carry certain hydrocarbons likely to solidify and causes blockages, one notable example being that of crude oil transported between subsea extraction wells and a central processing unit located on a rig at a distance of several kilometres.

However, if the insulated pipe enables the cooling of the hydrocarbons to be limited to an acceptable level when flowing, it is unable to prevent blockages when the fluid stops flowing. the operator has different solutions such as, for example, the installation of a second pipe parallel to the first one and linked to its extremity so as to be able to purge the pipe using an inert fluid in the event of the stoppage of the well, such fluid being stored and pumped from the central rig. Other methods comprise the injection of chemical products to prevent blocking. These solutions, however, require the installation of additional pipes and heavy equipment on the rig.

Oil transport pipes can be heated to as to avoid the formation of plugs inside the pipe, as used, for example, in refineries or other places sensitive to frost. To this end, electric heating cables can be arranged along the pipe. In addition, a layer of thermal insulation can be arranged around the heating cables in order to reduce heat losses in the surrounding environment and improve the heating efficiency for the transported fluid, and its temperature conservation. Depending on the quality of the thermal insulation, a greater or lesser heat flow is dissipated in the environment surrounding the pipe. The waste heat is offset by a power input developed by the heating cables.

U.S. Pat. No. 6,145,547 discloses a double-cased pipe in which an open-pore material at reduced pressure enables a clear improvement in the thermal insulation. Electric heating cables by Joule effect can be arranged in such a pipe. However, a rapid deterioration of the electric heating cables is observed when the supply voltage exceeds a few hundred volts. The deterioration of the electric heating cables eventually causes a short circuit and the breakdown of the electric heating system. The power input in each heating cable is thus restricted to avoid its deterioration. This restricted power input in each cable must be offset by particularly effective thermal insulation to avoid the need for a large number of electrical power supply points.

SUMMARY OF THE INVENTION

The aim of this invention is to remedy the drawbacks in the prior art by supplying a transportation pipeline heated by electrical cables by Joule effect enabling a large power input to be made in each heating cable whilst preserving effective thermal insulation.

This aim is reached thanks to a heated pipe for the transportation of a fluid comprising:
   a fluid transportation casing,
   one or several electric heating cables each arranged along the transportation casing, each cable comprising an electrically conductive core arranged in an electrically insulating and thermally conductive sheath,
   a thermally insulating material applied onto said heating cable or cables and onto the transportation casing,
   an external casing arranged around the thermally insulating material and made integral with the transportation casing in a sealed manner so as to define at least one annular space enabling its pressure to be reduced,
   wherein it comprises one or several means to reduce partial electrical discharges between said heating cable or cables and the transportation casing.

According to one particularity of the invention, the means to reduce the partial electrical discharges comprise at least one external layer of electrically conductive material, of a thickness of between 1 μm and 2000 μm, applied to said sheath of electrically insulating material on each heating cable.

According to another particularity of the invention, the means to reduce the partial electrical discharges comprise an external semi-conductive layer, of a thickness of between 20 μm and 2000 μm, applied onto said sheath of electrically insulating material on each heating cable, the external semi-conductive layer comprising an electrically insulating material forming a matrix in which particles of carbon are included, the concentration of carbon particles enabling a continuous electrical current to be made through the matrix.

According to another particularity of the invention, the means of reducing the partial electrical discharges comprise an internal semi-conductive layer, of a thickness of between 20 μm and 2000 μm, arranged between said core and said sheath of each cable, the internal semi-conductive layer comprising an electrically insulating material forming a matrix in which carbon particles are included, the concentration of carbon particles enabling a continuous electrical current to be made through the matrix.

According to another particularity of the invention, the means of reducing partial electrical discharges comprise at least one electrically insulating coating of a thickness of between 100 μm ad 1000 μm applied on the transportation casing.

According to another particularity of the invention, said electrically insulating coating comprises polymers with an electron emission coefficient less than that of steel.

According to another particularity of the invention, said electrically insulating coating comprises epoxy polymers.

According to one particularity of the invention, the means to reduce the partial electrical discharges comprise at least one insulating gas with a partial pressure of between 1 mbar and 1000 mbar introduced into said annular space and spreading up to the transportation pipe, said insulating gas representing 30 to 100% of the full gas mass in the annular space.

According to another particularity of the invention, the insulating gas is an electronegative gas.

According to another particularity of the invention, the insulating gas is selected from sulphur hexafluoride, carbon tetrachloride or chloroform.

According to another particularity of the invention, the partial pressure of the insulating gas is of between 1 mbar and 50 mbar.

According to another particularity of the invention, the insulating gas represents less than 100% of the gas present in said annular space, which additionally comprises one or several other gases each with a thermal conductivity of less than or equal to 27 mW·m$^{-1}$·K$^{-1}$.

According to another particularity of the invention, said gas or gases comprise air or nitrogen.

According to another particularity of the invention, the annular space is put at reduced pressure.

According to another particularity of the invention, the means to reduce the partial electrical discharges are arranged so as to prevent partial electrical discharges for a supply voltage of said electric heating cable or cables of at least 300V for a reduced pressure in the annular space of between 1 mbar and 100 mbar.

A first advantage is that the fluid transportation pipe may be designed to be globally compact thanks to the combination of effective thermal insulation at reduced pressure and Joule effect electric heating cables of small diameter, typically 10 mm or even 5 mm. Substantial power inputs may thus be made without premature deterioration of the cables.

One advantage of the present invention is also that the means to reduce the partial discharges in the annular space enable voltages of 1000V or even 3000V to be reached thereby enabling effective heating power inputs to be made for each cable extending along a continuous annular space at reduced pressure of several kilometres or even several tens of kilometres.

Another advantage of the present invention lies in the fact that the annular space, after having been equipped with the means to reduce the partial electrical discharges, durably retains its thermal insulation properties combined with substantial available electrical power.

One advantage of the present invention is also that it is applied to annular spaces extending along the full length of the pipe as well as to individually-supplied segmented annular spaces.

One advantage of the present invention also lies in the fact that existing electrically heated double-cased pipes comprising an annular space at reduced pressure may easily be equipped with means according to the invention to reduce partial electrical discharges and thus enable more substantial inputs of electrical power for a same section of electrical wire during their use.

Another advantage of the present invention is that it enables the operator of an oilfield to install a hydrocarbon production line using equipment that takes up little space on the oil rig, which is particularly advantageous namely for installations connecting new wells to existing rigs. The electric heating power is intrinsically low and all the equipment used as a rule for the starting and stopping phases of a passive pipe, which is to say non-heated, may thus be greatly reduced. Such equipment is, for example, equipment to inject fluidizing products or inert replacement fluids and equipment to purge or heat these fluids.

Another advantage of such a type of installation is that it enables a production line to be shut down immediately, such a shutdown not requiring the line to be purged in a limited amount of time, and thereby reducing the risk of accidents and improving the safety of the operators.

BRIEF DESCRIPTION OF THE DRAWING

Other characteristics, advantages and particulars of the invention will become more apparent from the additional descriptions given hereafter by way of example and with reference to the drawings, in which:

FIG. 1 represents a longitudinal section view of a heated fluid transportation pipe, FIG. 2 represents a detail in FIG. 1, FIG. 3 represents a cross section view of a heated fluid transportation pipe, FIG. 4 represents a process to implement a heated fluid transportation pipe equipped with means to reduce the partial electrical discharges, process comprising the injection of an insulating gas in the annular space.

DETAILED DESCRIPTION OF PREFERRED EMBODIMENTS

Figure 5:
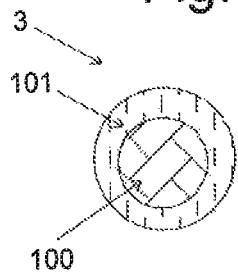
FIG. 5 represents a cross section view of a heating cable, FIGS. 6 and 7 each represent a cross section view of a heating cable equipped with means to reduce the partial electrical discharges that are in the form of one or several additional layers.

The invention will now be described in greater detail.

FIG. 1 shows a longitudinal section view of a heated fluid transportation pipe 1. The heated pipe 1 comprises a transportation casing 2 arranged in an external casing 7. Casings 2 and 7 are linked at their ends by reinforcing rings 9. The annular space 8 delimited by the external casing 7 and the transportation casing 2 is closed hermetically. The passages for the electrical cables or the openings for the pressurization are not shown in FIG. 1 for the sake of the clarity of the drawing.

The annular space 8 can be put at reduced pressure, which is to say pressure below atmospheric pressure. Its thermal insulation properties are thus optimized.

The annular space may also be left at atmospheric pressure. Thermal insulation is thus downgraded compared with an annular space at reduced pressure. To improve the thermal insulation properties, it is preferable for the pressure to be reduced in the annular space.

It is also possible for forced pressure to be established in the annular space, that is to say pressure above atmospheric pressure, however the thermal insulation properties are once again downgraded.

A thermally insulating material 6 is arranged inside the annular space. This thermally insulating material, such as that shown, namely enables the external casing 7 to be supported during assembly. A more flexible thermally insulating material using spacers to ensure the support function may also be considered.

Furthermore, the thermally insulating material 6 filling the annular space is an open-pore material to enable it to be put at reduced pressure. The thermally insulating material 6 is arranged on the electric heating cables 3 and on the transportation casing 2 to promote the heating of the transportation casing 2.

The interior of the annular space 8 comprises a mixture of pre-determined gases at pre-determined pressure. The pressure in the annular space is, for example, of between 1 mbar and 1000 mbar, that is $10^2$ to $10^5$ Pa. This gaseous mixture may comprise air or nitrogen.

In FIG. 1, two cables are shown schematically, but the pipe may naturally comprise a larger number of cables, such as twelve cables, as shown in the section view in FIG. 3. A single cable may also be considered for the heating.

The heating cables may each form a powered loop, or groups of three heating cables may be powered by a triple-phase supply in the form of a triangular or star arrangement. Groups of cables may also be provided that are multiples of three, such as for example six cables per group, each group being powered by a triple-phase supply.

As shown in FIG. 2, each cable 3 comprises at least one electrically conductive core arranged in an electrically insulating thermally conductive sheath. The electric heating cable can be of a simple structure that is relatively inexpensive, or specific cables combining a greater number of materials can be used, as will be described hereafter.

FIGS. 1 and 2 also show slightly undulating cables 3 to better illustrate the invention, but the invention is naturally applied in the same way to cables stretched tightly against the internal pipe 2.

The thermally insulating material 6 is adapted to the profile of cables 3 and partially encloses them. The heated cables 3 installed here directly along the length of the transportation casing are partly arranged in contact with the transportation casing 2 and partly at a short distance from it, as shown in FIG. 2. This arrangement creates the appearance of portions of cables electrically charged at the surface in the zones where these cables are located at a distance from the transportation casing 2, when the cable is electrically powered.

Similarly, in the zones where the cable is in contact with the transportation pipe, circumferential differences in potential may appear between the parts of the cable facing the pipe and the parts of the cable opposite the pipe when the cable is powered.

When a heating cable's 3 supply voltage exceeds a critical threshold, the accumulation of surface charges on the cables causes a partial electrical discharge between this charged zone of the cable and the transportation casing 2 and the ionization of the surrounding gaseous medium is made.

Indeed, even if the classical Paschen's law to determine the partial discharge voltage between two metallic electrodes separated by a gas cannot be directly applied, research work has shown that the heating cables are also subject to the corona effect and to partial electrical discharges.

Research work has also shown that these partial electrical discharges can be produced between the transportation casing and the external surface of the heating cable when there is an excessive accumulation of surface charges on the cable for a pre-determined voltage inside the cable.

Research work has also shown that partial discharges are promoted because of the low pressure and high electrical voltages in the cables.

Research work has further shown that each partial discharge results in the deterioration of the heating cable in the place where the discharge is produced and thus that the partial electrical discharges lead to the deterioration of the electrically insulating part of each cable because of the high number of partial discharges, ultimately leading to the local destruction of the insulation and to a short-circuit.

The present invention advantageously uses means to reduce the partial electrical discharges between the electric cables and the transportation casing.

The pipes electrically heated by Joule effect according to the invention may be used on land, underground or at sea.

First means to reduce the partial electrical discharges consist in using a gaseous mixture in the annular space comprising an electrically insulating gas representing 30 to 100% of the mass of the gaseous mixture. The insulating gas is, for example, sulphur hexafluoride $S-F_6$, chloroform $H-Cl_3$ or carbon tetrachloride $C-Cl_4$. These examples of gases are termed electronegative and they enable the elimination of the free electrons which could lead to the creation of partial discharges.

The insulating gas is, for example, completed by air or nitrogen. A gaseous mixture in the annular space comprises, for example, 50% of nitrogen and 50% of $S-F_6$.

The gas or gases added to the electrically insulating gas preferably have a thermal conductivity of less than or equal to 27 $mW \cdot m^{-1} \cdot K^{-1}$.

The power dissipated by conduction through an immobile air gap (in mW) may be calculated by the product of the thermal conductivity (in $mW \cdot m^{-1} \cdot K^{-1}$) of the temperature gradient (in K) and the surface (in $m^2$) divided by the thickness of the air gap (in m).

The partial pressure of the insulating gas is, for example, of between 1 and 1000 mbar and preferentially between 1 and 50 mbar.

Surprisingly, an electronegative gas such as sulphur hexafluoride $S-F_6$ is used at very low pressures with respect to the known uses of such a gas.

FIG. 4 shows a process to implement a heated fluid transportation pipe comprising an electrically insulating gas at reduced pressure injected into its annular space.

Firstly, the cables are arranged around and along the length of the fluid transportation casing. Each cable comprises an electrically conductive core arranged in an electrically insulating thermally conductive sheath.

A thermally insulating material is thereafter arranged around the electric heating cables. Ring compressors hold the sheets of thermally insulating material around the cables. The open-pore thermally insulating material, made, for example from pyrogenic silica, encloses a large volume of gas. A block of open-pore insulating material comprises, for example, between 50% and 95% in volume of gas.

The internal casing and the thermally insulating material are then introduced into an external casing.

This external casing is then joined hermetically to the internal casing, at least by the two ends of the pipe or by the two ends of each pipe section. The external casing thereby delimits a sealed annular space able to be put at reduced pressure.

Air is then pumped out of the annular space. The air is pumped until reaching a residual pressure that is lower than the final pressure to be obtained. The residual pressure is, for example, less than 50% of the final pressure. Such pumping is made by activating a pump sealed to the annular space.

Pumping may be performed by means of an orifice in a reinforcing ring or by means of an orifice pierced in the external casing and intended to be sealed thereafter.

An insulating gas is then introduced into the annular space. The insulating gas is introduced until the final desired pressure is obtained. The insulating gas comes, for example, from a tank sealed to the annular space.

Finally, the annular space is sealed off. The annular space thus comprises a gaseous mixture comprising a fraction of electrically insulating gas.

The pressure reduction may also be made directly from the final pressure without any insulating gases being injected, other means to reduce the partial electrical discharges being implemented.

In the case of pipe sections each comprising an annular space, the sections are each prepared in the factory before being assembled to form the pipeline.

The annular space may be sealed in a controlled environment so that the gaseous mixture is composed 100% of electrically insulating gas.

In the case of a pipe comprising a continuous annular space, the sections are assembled to form the annular space which is thereafter conditioned by the process according to the invention.

After having received the gaseous mixture, the annular space comprises at least one electrically insulating gas at partial pressure of between 1 and 1000 mbar and representing 30% to 100% of the mass of the gaseous mixture. Advantageously, after having been sealed off, the pipe conserves its thermally insulating properties combined with substantial available electric power throughout its lifetime.

Another advantage of the present invention is thus that the gas remains confined inside the annular space.

FIG. 5 shows a cross section view of one embodiment of a heating cable. The heating cable may be a cable comprising a conductive core 100 and a sheath 101 made of electrically insulating material.

The conductive core 100 is, for example, a single-strand wire or a braided multi-strand wire; the strand or strands may be made of copper, steel, iron, aluminium or an alloy of one of these materials.

The electrically insulating sheath 101 surrounds the core 100. This sheath 101 is, for example, made of a plastic material such as tetrafluoroethylene, polyethylene (PE), silicon, ethylene-propylene, cross-linkable polyethylene compound (XLPE) or polyvinyl chloride (PVC).

The core 100 has, for example, a diameter of between 0.5 mm and 5 mm and the layer 101 of electrically insulating material has a thickness, for example, of between 50 µm and 1000 µm.

Figure 7:
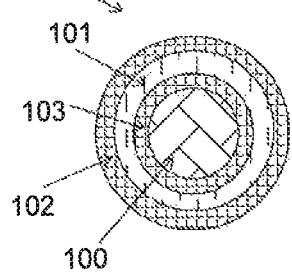
Figure 6:
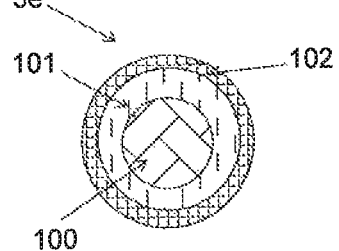

Second means to reduce the partial electrical discharges consist in using specific electric heating cables such as those shown in FIGS. 6 and 7.

FIG. 6 shows a cross section view of a heating cable equipped with means to reduce the partial electrical discharges that are in the form of a doped external layer. The external doped layer 102 has a thickness of between 20 µm and 2000 µm and is applied to said sheath 101 of electrically insulating material on each heating cable 3e.

The external layer 102 drains the charges on the external surface of the cable 3e towards the transportation casing 2 thanks to the zones of contact between the transportation casing and each cable. This draining prevents the appearance of charged zones on the external surface of the cable.

Each doped layer is, for example, made of an insulating material doped with particles of carbon-based conductive particles. The doped layer comprises, for example, an electrically insulating matrix of fluoroethylene, polyethylene, tetrafluoroethylene or silicon. This electrically insulating matrix is, for example, doped by grains or flakes of graphite or carbon black.

For each doped layer, also termed semi-conductive layer, doping is made at a level exceeding the percolation threshold thereby enabling the conductive doping particles to make a continuous electrical link through the matrix containing these particles.

The external layer 102 of each cable may also be made of an electrically conductive material. This electrically conductive material is, for example, a conductive paint or an electrically conductive coating applied under a vacuum. The thickness of this layer of conductive material is, for example, of between 1 µm and 2000 µm.

The conductive coating forming layer 102 comprises, for example, copper, steel, iron, aluminium or an alloy of these metals.

The conductive paint forming layer 102 comprises, for example, a binder including copper, steel, iron, aluminium or a mixture of these elements, whose concentration in the binder enables continuous conduction.

FIG. 7 shows a cross section view of a heating cable equipped with means to reduce the partial electrical discharges that are in the form of a doped external layer 102 and internal layer 103.

The doped internal layer 103 is of a thickness of between 20 µm and 2000 µm. This doped internal layer is arranged between the core 100 of electrically conductive material and the sheath 101 of electrically insulating material of each cable 3d. Advantageously, this doped internal layer 103 has a draining function and prevents the appearance of charged internal zones, namely on the internal surface of the sheath 101 of electrically insulating material, namely in the portions where the layer 103 applied to the core 100 is separated from the latter.

Third means to reduce the partial electrical discharges consist in applying an insulating coating 30 onto the transportation casing 2.

Figure 8:
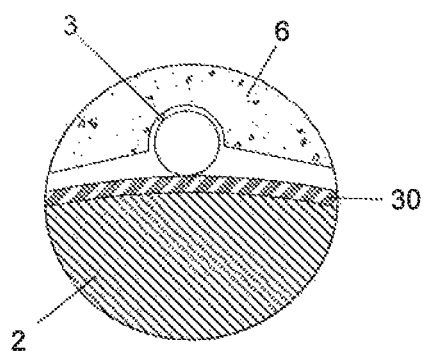
FIG. 8 represents a detail of the arrangement of the heating cable with respect to the means to reduce the partial electrical discharges that comprise an insulating coating applied to the transportation pipe.

FIG. 8 shows a detail of the arrangement of the heating cable 3 with respect to the means to reduce the electrical discharges and comprising the insulating coating 30 applied to the transportation pipe 2.

The insulating coating 30 of between 100 µm and 1000 µm in thickness is applied onto the transportation casing 2 to limit the exchanges of charged particles between the transportation casing 2 and the heating cables 3. Such a coating 30 is, for example, in the form of a specific paint whose electron emission coefficient is less than that of steel. The coating comprises, for example, polymers such as epoxy polymers. The number of electrons available on the transportation casing is thus reduced, which is to say that the secondary electron emission coefficient is reduced.

Figure 9:
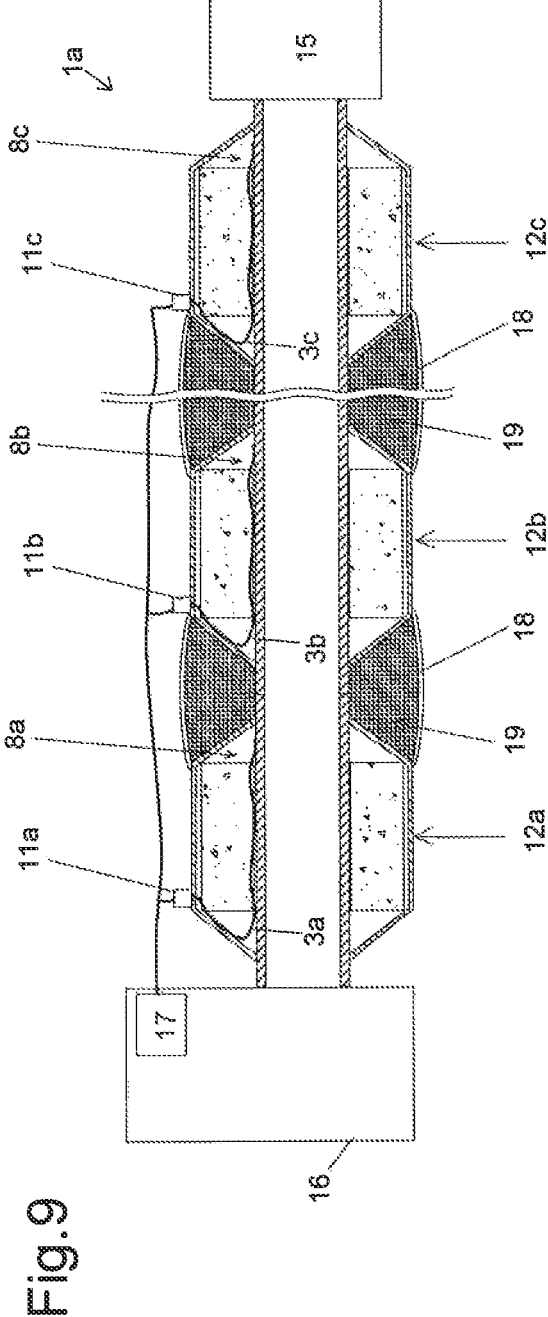
FIG. 9 represents a longitudinal section view of a heated fluid transportation pipe comprising a longitudinally segmented annular space.

FIG. 9 shows a longitudinal section view of a heated fluid transportation pipe 1a comprising sections 12a, 12b and 12c whose annular spaces 8a, 8b or 8c are conditioned in the factory before the sections are assembled end to end, for example, in situ. Each section comprises means according to the invention to reduce the partial electrical discharges. In each section, the electric heating cables 3a, 3b or 3c are electrically connected hermetically by means of a connector 11a, 11b or 11c to a power line 10 arranged in the surrounding environment in proximity to the pipe.

The heated pipe 1a extends from a wellhead 15 to an operating platform 16. Naturally, the number of sections joined end to end is determined according to need. The operating platform 16 namely comprises an electrical generator 17 connected to the power line 10

Resin 18 is arranged around each joint between two sections, this resin being covered by a sleeve. The electric connectors 11a, 11b and 11c are connected as the pipe is being assembled.

In the case of an annular space that is segmented along the pipe, the heating is, for example, made by 3 to 6 electric cables in each segment, each of a length of 12 to 200 m. The electrically conductive cores of the cables have, for example, a section of 0.1 m m² to 1 mm² and the cables have, for example, a diameter of less than 4 mm.

Figure 10:
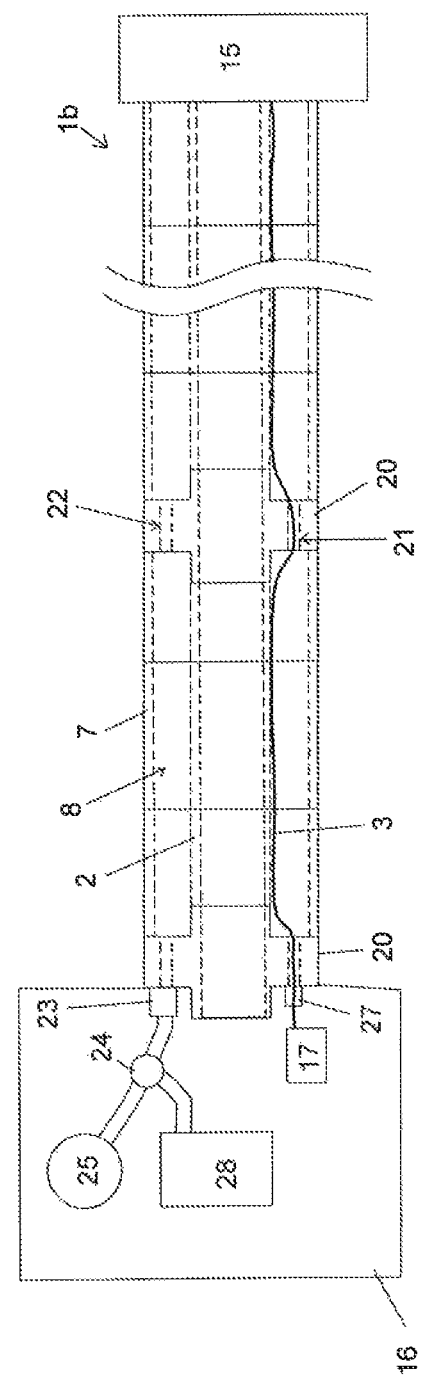
FIG. 10 represents a longitudinal section view of a heated fluid transportation pipe comprising an annular space extending along the length of the pipe.

FIG. 10 shows a longitudinal section view of a heated fluid transportation pipe 1b whose annular space extends along the length of the pipe. This pipe advantageously comprises means to reduce the partial electrical discharges according to the invention. The pipe is assembled from sections joined end to end whose annular spaces inter-communicate. Reinforcing rings 20, also termed bulkheads, may be positioned between the sections according to construction needs.

The reinforcing rings 20 comprise an inner ring to join the transportation casing 2 and an outer ring to join the external casing 7. The inner and outer rings of the reinforcing ring are joined to one another but passages 21 are arranged for the passage of the electric cables and passages 22 may also be arranged to allow two portions of the annular space 8 to inter-communicate.

FIG. 10 shows, by way of example, conditioning means for a pipe during the final stages of its installation. One end of the pipe 1*b* is linked to a wellhead 15. In the example shown, the other end of the pipe 1*b* is linked to the operating platform 16 which comprises a gas pressurization and injection system linked hermetically to the annular space 8. The pressurization system comprises a pressure sensor 23 linked to a valve 24. The measured pressure is representative of the pressure in the annular space. The valve may be closed or opened to allow the annular space 8 to communicate with a vacuum pump 25 or a tank 26 for gas such as an electronegative gas. The annular space may thus be put under reduced pressure. After creating the reduced pressure, the vacuum pump and the tank may be dismounted and the annular space sealed off.

The reduced pressurization may also be performed prior to the installation phase.

Furthermore, the electric heating cables 3 are linked to an electrical power supply 17 by a sealed electric connector 27.

The cables each extend over the full length of the annular space and may be of a length of 1 km to 100 km. Between 6 and 72 heating cables are, for example, arranged around the transportation casing 2, the electrically conductive cores of the cables having, for example, a section of between 3 mm$^2$ and 15 mm$^2$ and the cables having, for example, a diameter of less than 15 mm.

Preferably, the length of each cable is of between 3 and 30 km, the number of cables arranged around the transportation casing is of between 12 and 36 and the section of the core of each cable is of between 3 mm$^2$ and 8 mm$^2$.

Different means to reduce the partial electrical discharges may naturally be combined to optimize the possibilities of use for a pipe comprising a segmented annular space or for a pipe comprising a continuous annular space.

A person skilled in the art will recognize that the present invention enables other variant embodiments. Consequently, the present embodiment must be considered as illustrating the invention.

What is claimed is:

1. A heated pipe for the transportation of a fluid, the heated pipe comprising:
    a fluid transportation casing;
    at least one electric heating cable arranged along the transportation casing, the at least one heating cable including an electrically conductive core arranged in an electrically insulating and thermally conductive sheath;
    a thermally insulating material applied onto the at least one heating cable and onto the transportation casing;
    an external casing arranged around the thermally insulating material and being integral with the transportation casing in a sealed manner so as to define at least one annular space, and a pressure in the at least one annular space being less than atmospheric pressure; and
    at least one external layer of electrically conductive material configured to reduce partial electrical discharges between the at least one heating cable and the transportation casing, the at least one external layer of electrically conductive material having a thickness between 1 µm and 2000 µm, the at least one external layer of electrically conductive material being: (i) applied to the sheath of electrically insulating material on each heating cable, and (ii) positioned so as to extend around at least a majority of a circumference of the at least one heating cable.

2. A heated pipe for the transportation of a fluid, the heated pipe comprising:
    a fluid transportation casing;
    at least one electric heating cable arranged along the transportation casing, the at least one heating cable including an electrically conductive core arranged in an electrically insulating and thermally conductive sheath;
    a thermally insulating material applied onto the at least one heating cable and onto the transportation casing;
    an external casing arranged around the thermally insulating material and being integral with the transportation casing in a sealed manner so as to define at least one annular space, and a pressure in the at least one annular space being less than atmospheric pressure; and
    at least one external semi-conductive layer configured to reduce partial electrical discharges between the at least one heating cable and the transportation casing, the at least one external semi-conductive layer being applied onto the sheath of the electrically insulating material on each heating cable, and the at least one external semi-conductive layer having: (i) a thickness of between 20 µm and 2000 µm, and (ii) an electrically insulating material forming a matrix in which particles of carbon are included, the carbon particles within the matrix enabling a continuous electrical current to be conducted through the matrix.

3. A heated pipe for the transportation of a fluid, the heated pipe comprising:
    a fluid transportation casing;
    at least one electric heating cable arranged along the transportation casing, the at least one heating cable including an electrically conductive core arranged in an electrically insulating and thermally conductive sheath;
    a thermally insulating material applied onto the at least one heating cable and onto the transportation casing;
    an external casing arranged around the thermally insulating material and being integral with the transportation casing in a sealed manner so as to define at least one annular space, and a pressure in the at least one annular space being less than atmospheric pressure; and
    at least one internal semi-conductive layer configured to reduce partial electrical discharges between the at least one heating cable and the transportation casing, the at least one internal semi-conductive layer being arranged between the core and the sheath of each heating cable, and the at least one internal semi-conductive layer having: (i) a thickness of between 20 µm and 2000 µm, and (ii) an electrically insulating material forming a matrix in which particles of carbon are included, the carbon particles within the matrix enabling a continuous electrical current to be conducted through the matrix.

4. A heated pipe for the transportation of a fluid, the heated pipe comprising:
    a fluid transportation casing;
    at least one electric heating cable arranged along the transportation casing, the at least one heating cable including an electrically conductive core arranged in an electrically insulating and thermally conductive sheath;

a thermally insulating material applied onto the at least one heating cable and onto the transportation casing;

an external casing arranged around the thermally insulating material and being integral with the transportation casing in a sealed manner so as to define at least one annular space, and a pressure in the at least one annular space being less than atmospheric pressure; and at least one insulating gas configured to reduce partial electrical discharges between the at least one heating cable and the transportation casing, the at least one insulating gas having a partial pressure of between 1 mbar and 1000 mbar introduced into the annular space and expanding up to the transportation pipe, and the insulating gas constituting 30% to 100% of a full gas mass within the annular space.

5. The heated pipe according to claim 4, wherein the insulating gas is an electronegative gas.

6. The heated pipe according to claim 5, wherein the insulating gas is selected from sulphur hexafluoride, carbon tetrachloride and chloroform.

7. The heated pipe according to claim 4, wherein the partial pressure of the insulating gas is between 1 mbar and 50 mbar.

8. The heated pipe according to claim 5, wherein
the insulating gas constitutes less than 100% of the gas present in the annular space, and
the gas present in the annular space additionally comprises one or several other gases each with a thermal conductivity of less than or equal to 27 $mW \cdot m^{-1} \cdot K^{-1}$.

9. The heated pipe according to claim 8, wherein the one or several other gases comprise air or nitrogen.

10. The heated pipe according to claim 1, wherein the pressure is between 1 mbar and 1000 mbar.

11. The heated pipe according to claim 2, wherein the pressure is between 1 mbar and 1000 mbar.

12. The heated pipe according to claim 3, wherein the pressure is between 1 mbar and 1000 mbar.

13. The heated pipe according to claim 4, wherein the pressure is between 1 mbar and 1000 mbar.

* * * * *